June 6, 1950 J. W. WHEAT 2,510,447
CLUTCH MECHANISM FOR FISHING REELS
Filed Feb. 24, 1947 2 Sheets-Sheet 1

Inventor
Joseph W. Wheat

By Clarence A. O'Brien
and Harvey B. Jacobson
Attorneys

June 6, 1950     J. W. WHEAT     2,510,447

CLUTCH MECHANISM FOR FISHING REELS

Filed Feb. 24, 1947     2 Sheets-Sheet 2

*Inventor*

Joseph W. Wheat

By Clarence A. O'Brien and Harvey B. Jacobson
*Attorneys*

Patented June 6, 1950

2,510,447

UNITED STATES PATENT OFFICE 2,510,447

CLUTCH MECHANISM FOR FISHING REELS

Joseph W. Wheat, Seattle, Wash.; Signa C. Wheat, administratrix of said Joseph W. Wheat, deceased Application February 24, 1947, Serial No. 730,313

3 Claims. (Cl. 192—45.2)

1

The present invention relates to new and useful improvements in fishing reels and more particularly to an automatic clutch mechanism between the crank handle of the reel and the spool on which the line is wound whereby upon the initial winding motion of the handle the clutch mechanism will be thrown into engagement for connecting the handle to the spool to wind the line thereon and upon a paying out of the line, such as when casting or a fish takes the line out the clutch mechanism will automatically disengage the handle from the spool whereby to enable free paying out of the line without interference by the handle thus providing a free spooling action.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
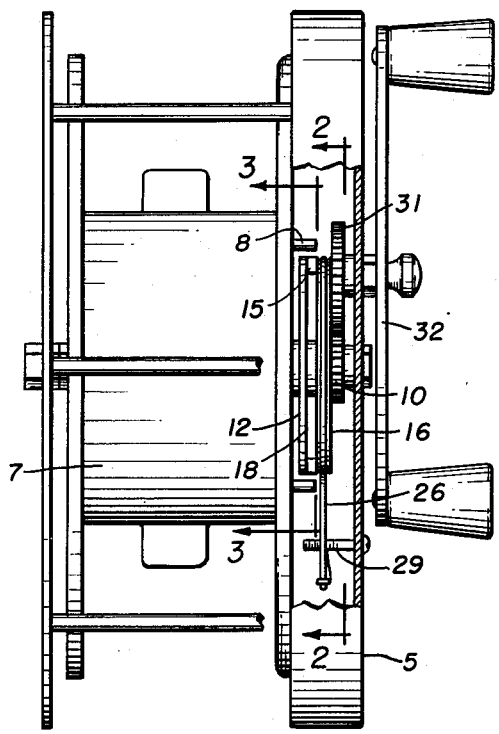
Figure 1 is a view in elevation of the reel with part of the frame broken away and shown in section to show the clutch mechanism.
Figure 2:
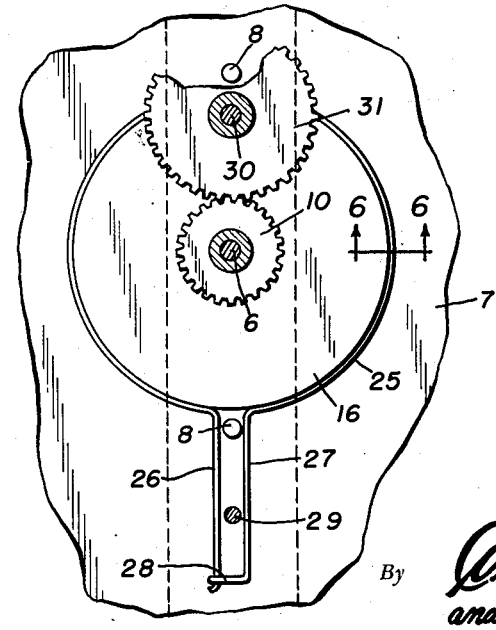
Figure 2 is an enlarged fragmentary sectional view taken on a line 2—2 of Figure 1.

Referring now to the drawings in detail wherein for the purposes of illustration I have disclosed a preferred embodiment of the invention the numeral 5 designates the reel frame to the sides of which a stationary shaft 6 is secured and on which the spool 7 is journaled for free rotation. A plurality of pins 8 project outwardly from one of the flanges of the spool at diametrically opposite sides thereof.

A hub 9 is freely journaled on the shaft 6 adjacent the end of the spool provided with the pins 8, one end of the hub being formed with a gear 10 of a diameter greater than the hub and the

2 other end of the hub is stepped to provide a square portion 11 on which a disk 12 is held and secured to the hub for rotation therewith by means of a nut 13 threaded on a reduced extension 14 at the adjacent end of the hub.

The disk 12 is positioned on the hub at its inner end and adjacent the spool and the outer surface of the disk is formed with a pair of rectangular shaped lugs 15 at diametrically opposite sides thereof.

An outer disk 16 is journaled on the hub 9 and is formed on its inner face with a pair of diametrically opposite pins 17 on which a pair of semi-circular cams 18 are pivoted at their central portions. The ends of the cams are formed with radially outwardly projecting shoulders 19 and 20, the shoulder 19 of one cam being opposed to the shoulder 20 of the other cam and spaced therefrom for positioning at opposite sides of the lugs 15 in slightly spaced relation therefrom as shown in Figure 3 of the drawings.

A pair of stop pins 21 are also carried on the outer face of the disk 16 for engagement by the rear inner edge of the shoulders 19 for checking the retracting movement of the cam shoulders and locking the disk 12 to the disk 16 against idle rotation.

Figure 3:
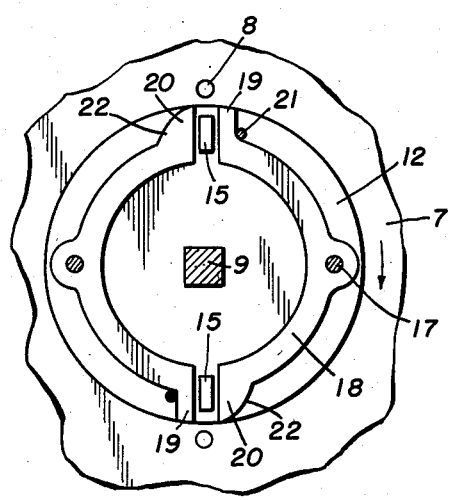
Figure 3 is an enlarged fragmentary sectional view taken on a line 3—3 of Figure 1 and showing the cams of the clutch in retracted or free spooling position.
Figure 4:
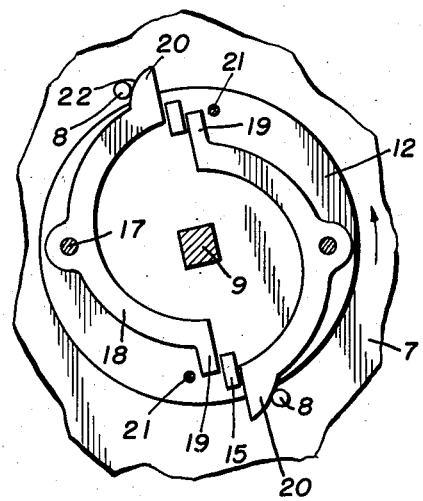
Figure 4 is a similar view showing the cams in projected or winding position.
Figure 5:
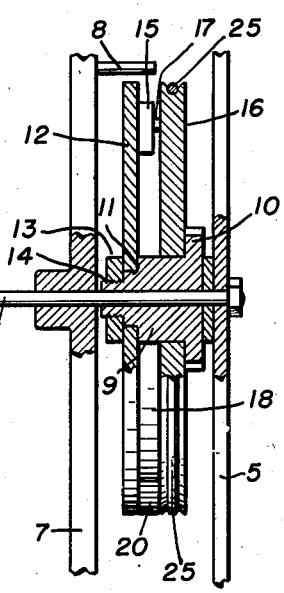
Figure 5 is a sectional view of the hub at one end of the reel.
Figure 6:
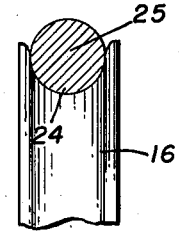
Figure 6 is a fragmentary sectional view taken on a line 6—6 of Figure 2.

As shown to advantage in Figures 3 and 4 of the drawings the edge of the shoulders 20 adjacent the lugs 15 are straight while the rear edges thereof are rounded as shown at 22 to form cam heads.

The periphery of the disk 16 is formed with a groove 24 in which a wire brake 25 is seated. The brake 25 substantially surrounds the disk 16 and the ends of wire are bent radially outwardly in spaced parallel relation as shown at 26 and 27 and connected to each other at their outer ends by a conventional safety pin catch 28. The radially extending ends or arms 26 and 27 of the brake are positioned at opposite sides of a pin 29 secured to the adjacent side of the frame 5 whereby to secure the brake against rotary movement and to frictionally hold the disk 16 against idle rotation.

A shaft 30 is journaled in the frame 5 to the end of which a gear 31 is secured for meshing with the gear 10 and to the outer end of the shaft 30 is secured a crank handle 32.

In the operation of the device, the semi-circular cams 18 are normally held with the cam heads 20 in a retracted position as shown in Figure 3, out of the path of pins 8 carried by the spool, whereby the spool is free for casting without interference by the handle 32.

When it is desired to reel in the line, the handle 32 is rotated in a clockwise direction whereupon gear 31 will be rotated in a like direction and gear 10 rotated in an opposite or counter-clockwise direction. Gear 10 being formed on the hub 9 and disk 12 being secured to the squared portion of the hub the disk 12 will be rotated counter-clockwise thereby causing lugs 15 to engage the ends of the cams 18 provided with the shoulders 20 so that the cams 18 will be swung on their pivot pins 17 outwardly, as shown in Figure 4, into a position for engaging the rounded edges 22 of the shoulders 20 with the pins 8 of the spool and thus connecting the spool for rotation with the disk 12. The cams are limited in their outward movement by the radial shoulders 19 at the other ends of the cams 18 striking the lugs 15.

When the spool is rotated in a reverse direction, as by casting or a fish paying out the line and the handle released, the pins 8 while in contact with the rounded edges 22 of the shoulders 20 will move said shoulders slightly to pivot the cams 18 and swing the shoulders 20 inwardly to thus retract the same into a position out of the path of the pins 8 and the spool is then free. The radial shoulders 19 strike the stop pins 21 during the retracting movement of the cams to limit such movement.

The disk 16 is frictionally held stationary by the wire brake 25 and the pins 21, cam shoulders 19 and lugs 15 connect the disks 12 and 16 to the handle to hold the handle and disks against idle rotation during the unwinding action of the reel.

Having described my invention, what is claimed as new is:

1. Operating means for a fishing line reel rotatable on a shaft comprising a pair of diametrically opposite drive pins on one side of the reel, a hub rotatable about said shaft, a disk freely rotatable on the hub, a pair of semi-circular cams pivoted intermediate the ends thereof on said disk at diametrically opposite sides of the same for swinging on the pivots thereof in one and the same direction to project relatively opposite ends thereof into driving engagement with said pins, said cams being rotatable with said disk to drive said reel by said pins, means on said hub rotatable thereby for swinging said cams and subsequently rotating the same with said disk, and manipulative means for rotating said hub.

2. Operating means for a fishing line reel rotatable on a shaft comprising a pair of diametrically opposite drive pins on one side of the reel, a hub rotatable about the shaft, a disk freely rotatable on said hub, a pair of semi-circular cams pivoted intermediate the ends thereof on said disk and at diametrically opposite sides of the same for swinging on the pivots thereof in one and the same direction to project relatively opposite ends thereof into driving engagement with said pins, said cams being rotatable with said disk to drive said reel by said pins, means on said hub rotatable thereby for swinging said cams and subsequently rotating the same with said disk, and manipulative means for rotating said hub, said first mentioned means comprising a second disk fast on said hub, and lugs on said second disk for engagement with said cams by rotation of said second disk.

3. Operating means for a fishing line reel rotatable on a shaft comprising a pair of diametrically opposite drive pins on one side of the reel, a hub rotatable about said shaft, a disk freely rotatable on the hub, a pair of semi-circular cams pivoted intermediate the ends thereof on said disk at diametrically opposite sides of the same for swinging on the pivots thereof in one and the same direction to project relatively opposite ends thereof into driving engagement with said pins, said cams being rotatable with said disk to drive said reel by said pins, means on said hub rotatable thereby for swinging said cams and subsequently rotating the same with said disk, manipulative means for rotating said hub, and a brake for the disk first mentioned.

JOSEPH W. WHEAT.

REFERENCES CITED

The following references are of record in the file of this patent:

UNITED STATES PATENTS

| Number | Name | Date |
| --- | --- | --- |
| 929,867 | Meisselbach et al. | Aug. 3, 1909 |
| 2,395,576 | Moroney | Feb. 26, 1946 |
| 2,448,912 | Ress et al. | Sept. 7, 1948 |